United States Patent
De Mattia et al.

(10) Patent No.: US 9,050,758 B2
(45) Date of Patent: Jun. 9, 2015

(54) PROCESS FOR MANUFACTURING A PART MADE OF COMPOSITE MATERIAL THAT COMPRISES AT LEAST ONE RADIUS OF CURVATURE

(75) Inventors: Denis De Mattia, Basse Goulaine (FR); Aurelien Boyeldieu, Le Bignon (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 366 days.

(21) Appl. No.: 13/420,986

(22) Filed: Mar. 15, 2012

(65) Prior Publication Data

US 2012/0234489 A1 Sep. 20, 2012

(30) Foreign Application Priority Data

Mar. 16, 2011 (FR) ...................... 11 52137

(51) Int. Cl.
*B29C 65/70* (2006.01)
*B29C 70/02* (2006.01)
*B29C 70/34* (2006.01)
*B29C 70/38* (2006.01)
*B29K 105/08* (2006.01)
*B29L 31/00* (2006.01)
*B29C 70/54* (2006.01)

(52) U.S. Cl.
CPC .............. *B29C 70/342* (2013.01); *B29C 70/34* (2013.01); *B29C 70/386* (2013.01); *B29K 2105/0872* (2013.01); *B29L 2031/001* (2013.01); *B29C 70/543* (2013.01)

(58) Field of Classification Search
CPC B29C 66/721; B29C 66/836; B29C 66/8362; B29C 2043/3644
USPC ................ 264/258, 299, 308, 319, 320, 324; 156/285, 286, 312, 574
See application file for complete search history.

(56) References Cited

U.S. PATENT DOCUMENTS

| 5,039,371 | A | * | 8/1991 | Cremens et al. ............... 156/382 |
| 5,433,165 | A | * | 7/1995 | McGuiness et al. .......... 114/357 |
| 5,939,013 | A | * | 8/1999 | Han et al. ...................... 264/510 |
| 7,824,512 | B2 | * | 11/2010 | Lauder et al. ................... 156/64 |
| 8,574,388 | B2 | * | 11/2013 | Colombo et al. ............. 156/243 |
| 2010/0314807 | A1 | | 12/2010 | Lengsfeld et al. | |

FOREIGN PATENT DOCUMENTS

FR 2942741 9/2010
WO 2010100386 9/2010

OTHER PUBLICATIONS

French Search report dated Oct. 25, 2011, in corresponding French Application.

* cited by examiner

*Primary Examiner* — Scott W Dodds
(74) *Attorney, Agent, or Firm* — Young & Thompson

(57) ABSTRACT

A process for the production of a part made of composite material including at least one radius of curvature, includes a stage for deposition of pre-impregnated fiber layers (24) on a device (22) of convex shape on one another and for compacting the layers, characterized in that localized and repeated forces are applied in such a way as to cover the zone of the radius of curvature, at a given instant the forces being applied on a zone that is less than half of the zone of the radius of curvature, so as to compact the fiber layers (24) locally during the deposition stage.

6 Claims, 3 Drawing Sheets

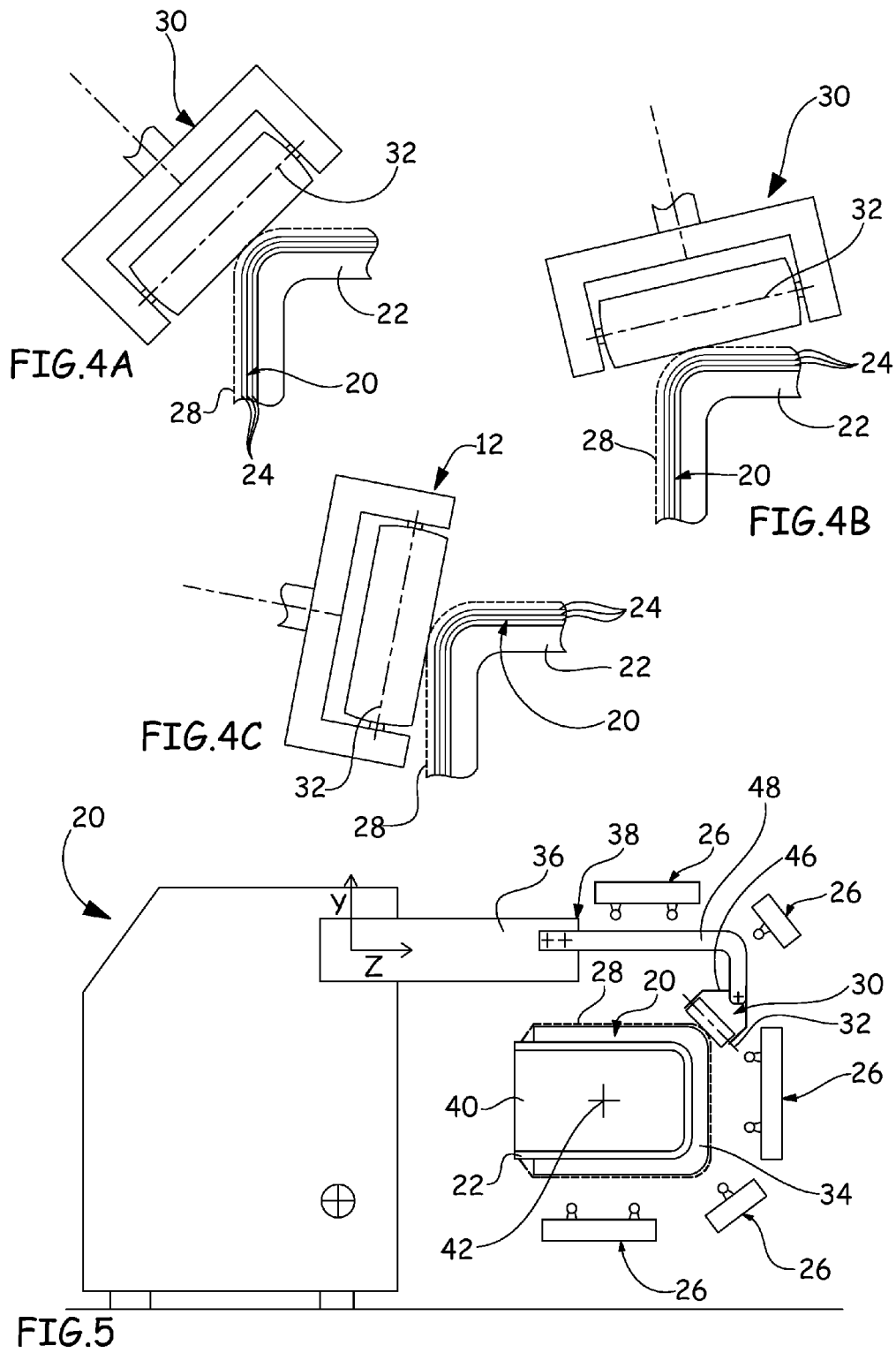

PROCESS FOR MANUFACTURING A PART MADE OF COMPOSITE MATERIAL THAT COMPRISES AT LEAST ONE RADIUS OF CURVATURE

BACKGROUND OF THE INVENTION

1. Field of the Invention

This invention relates to a process for manufacturing a part made of composite material that comprises at least one radius of curvature, such as, for example, an angle bar or a stiffener with a U-shaped cross-section.

2. Description of the Related Art

FIGS. 1A and 1B show a stiffener 10 with a U-shaped cross-section. As illustrated in FIGS. 2A and 2B, this stiffener 10 can be produced by stacking pre-impregnated resin fiber layers 14 on a device 12 of convex shape.

The fiber layers 14 can be deposited using a draping machine, according to the predetermined fiber orientations.

After the deposition of the fiber layers, the unit, also covered by a bladder, is introduced into an autoclave and subjected to a cycle of temperature and pressure in such a way as to bring about the polymerization of the stiffener 10. During this polymerization stage, the pressure outside of the bladder can reach on the order of 7 to 10 bar. This pressure has the effect of causing a contraction whose purpose is to expel the air trapped between the layers and around the fibers during polymerization.

By way of indication, the contraction generates a reduction in the thickness of the part that corresponds to approximately 12 to 15% of its thickness.

When the part is supported by a device of convex shape, the contraction generates excess fiber length, more particularly at zones that have a reduced radius of curvature. Because of this excess fiber length, after polymerization, in zones that have a reduced radius of curvature, waves of fibers are produced that tend to reduce in particular the mechanical characteristics of the part.

Consequently, to limit the degradation of mechanical characteristics or other characteristics of the part, compacting of the fiber layers 14 is done during the draping phase.

According to a first operating mode that is illustrated in FIG. 2A and that is called vacuum compacting, the layers 14 of fibers deposited on the device 12 are covered with a bladder 16, and an air vacuum is applied under the bladder. This operation is renewed periodically during the draping phase, every 5 to 10 deposited layers. This operating mode makes it possible to obtain a contraction with an excess thickness before polymerization that corresponds to approximately 8% of the part's thickness that is not optimal.

According to another operating mode that is illustrated in FIG. 2B and that is called vacuum compacting with heating, a vacuum compacting is produced as described above, combined with an elevation in temperature of the material to approximately 80° C. using heating means 18. Even if this operating mode makes it possible to improve the vacuum compacting, it is not fully satisfactory because the vacuum compacting with heating makes it possible to obtain a contraction with an excess thickness before polymerization that corresponds to approximately 4% of the thickness of the part that is not optimal.

One solution for optimizing the contraction could consist in increasing the temperature during compacting. However, this solution cannot be considered because a higher temperature would lead to too high a fluidity of the resin and consequently a wringing-out of the zones that have a reduced radius of curvature because of the migration of the resin toward less compressed zones.

Another solution for optimizing the contraction could consist in increasing the frequency of vacuum compacting operations with heating. However, this solution is not satisfactory because the repetition of the heating cycles leads to increasing the enthalpy level of the resin, which is detrimental during polymerization.

In addition, the increase in the frequency of vacuum compacting operations with heating leads to reducing productivity and to increasing the production costs significantly.

BRIEF SUMMARY OF THE INVENTION

The purpose of this invention is to remedy the drawbacks of the prior art by proposing a process for manufacturing a part that is made of composite material that is produced by stacking fiber layers that make it possible to improve the contraction of the fiber layers during the deposition phase of said layers.

For this purpose, the invention has as its object a process for the production of a part that is made of composite material comprising at least one radius of curvature, comprising a stage for deposition of pre-impregnated fiber layers on one another on a device, and compacting said layers, followed by a polymerization stage, characterized in that localized and repeated forces are applied in such a way as to cover the zone of the radius of curvature, where at a given instant, the forces are applied on a zone that is less than half of the zone of the radius of curvature, so as to compact the fiber layers locally during the deposition stage.

BRIEF DESCRIPTION OF THE DRAWINGS

Other characteristics and advantages will emerge from the following description of the invention, a description that is provided only by way of example, relative to the accompanying drawings in which:

FIGS. 4A to 4C are diagrams that illustrate an operating mode for compacting fiber layers according to the invention, and FIG. 5 is a diagram that illustrates a device that makes possible the implementation of the process for compacting fiber layers according to the invention.

DETAILED DESCRIPTION OF THE PREFERRED EMBODIMENTS

FIGS. 4A to 4C illustrate a device 22 of convex shape to which are connected pre-impregnated fiber layers 24, on one another, so as to produce a part 20 made of composite material after polymerization.

According to the illustrated example, the part 20 has a U-shaped profile along a transverse cutaway. Of course, the invention is not limited to this profile and can be applied to other parts with a profile that has at least one reduced radius of curvature. Reduced radius of curvature is defined as a radius at which the fibers can roll during the polymerization because of the contraction if the fiber layers 24 are not compacted during the deposition operation of said layers 24.

The device 22 is not described in more detail because it varies depending on the part that is to be produced. In addition, it is known to one skilled in the art and can be identical to devices 12 of the prior art.

According to the applications, the number of fiber layers, the nature of the fibers, and the orientation of the layers can vary. Consequently, these elements are not described in more detail.

The fiber layers 24 are supported on the device 22 either manually or in an automated manner using a draping device. They are supported on the device 22, taking care with the orientation of the fibers.

Hereinafter, the longitudinal direction corresponds to the most significant length of the part. Transverse plane is defined as a plane that is perpendicular to the longitudinal direction.

Figure 1A:
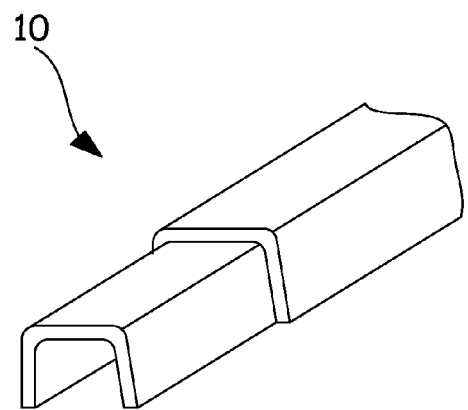
FIG. 1A is a perspective view of an example of a part that is obtained according to the process of the invention.
Figure 1B:
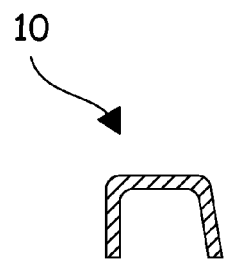
FIG. 1B is a transverse cutaway of the part that is illustrated in FIG. 1A.
Figure 2A:
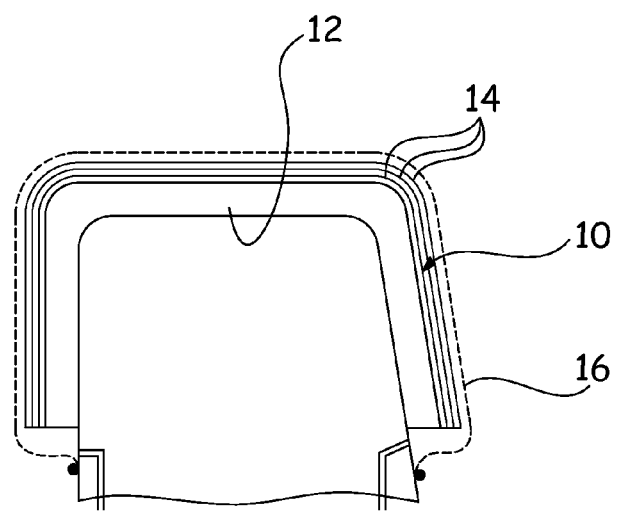
FIG. 2A is a diagram that illustrates a first operating mode for compacting fiber layers according to the prior art.
Figure 2B:
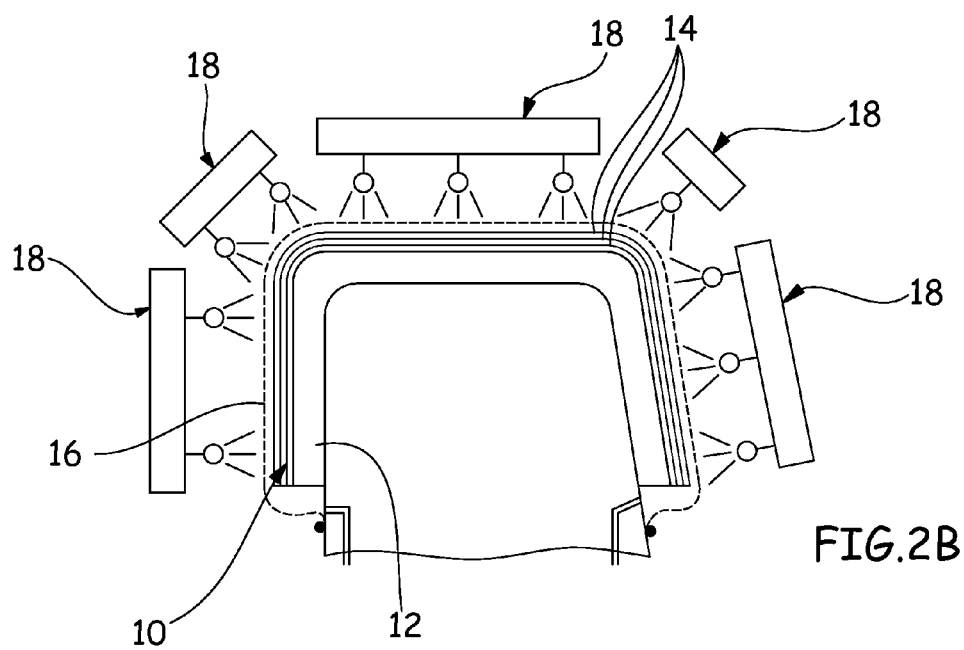
FIG. 2B is a diagram that illustrates another operating mode for compacting fiber layers according to the prior art.
Figure 3:
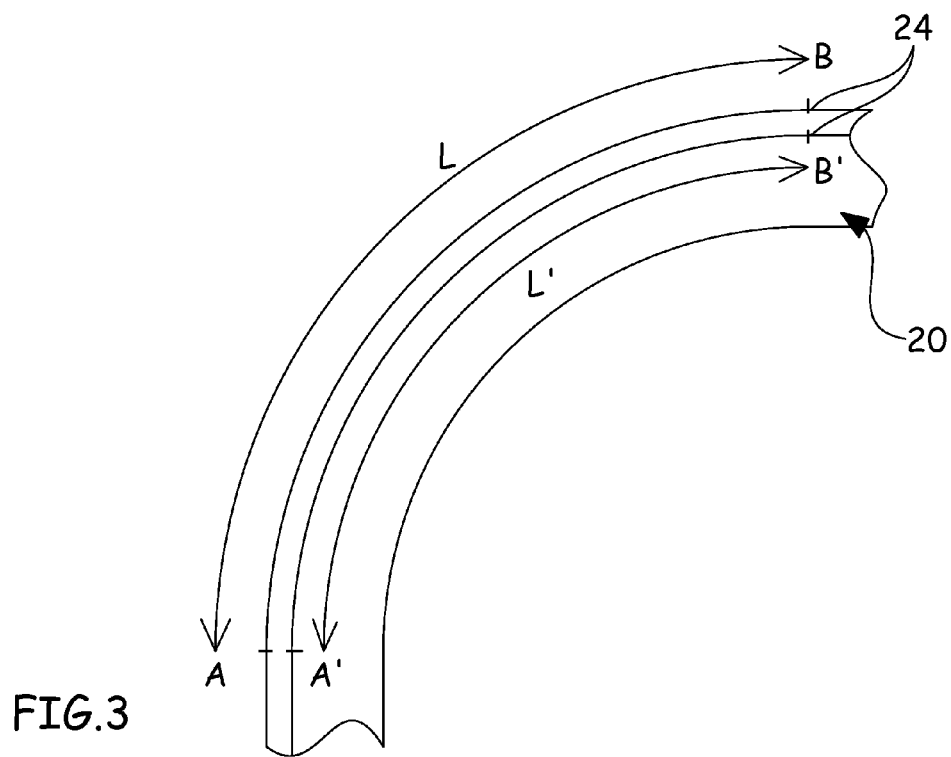
FIG. 3 is a cutaway that illustrates the risks of waves of the fibers at the radii of curvature of one part.

As illustrated in FIG. 3, the length L between two distant points A and B before contraction is greater than the length L' between the two points A' and B' that correspond respectively to the points A and B after contraction. The reduction of length $\Delta L = L - L'$ is based on the radius of curvature, the position of the fiber in the thickness of the part, the contraction coefficient, and the orientation of the fiber. To the extent that the ratio of length $\Delta L/L$ is inversely proportional to the radius of curvature and the risk of waving of the fiber is proportional to the ratio of length $\Delta L/L$, the risk of waving is all the greater the smaller the radius of curvature.

To limit this risk of waving, the process of the invention consists in compacting the fiber layers by applying localized forces that are distributed over the zone of the radius of curvature on the last layer that is placed in a direction that is preferably approximately perpendicular to said layer, in such a way as to compact locally the fiber layers.

Localized force is defined as—in a transverse plane at a given instant—the forces being applied on a zone that is less than half of the zone of the radius of curvature.

This solution makes it possible to obtain a high local pressure that is, however, of short duration. Thus, the resin flows into the thickness of the part, filling in the empty spaces that are located between the layers and between the fibers. With the force being localized and short, the risks of wringing out the curvature zone are limited.

Preferably, at least one point support is used for applying localized forces.

Thus, unlike a bladder that applies pressure over the entire surface of the radius of curvature at the same time, the point support exerts a pressure that does not extend over the entire zone of the radius of curvature but that is repeated in such a way as to cover said zone.

According to a first operating mode, the point support can apply localized and repeated forces in such a way as to cover the zone of the radius of curvature. In this case, the point support is driven by a back-and-forth movement in a direction that is essentially perpendicular to the last fiber layer at the point of contact, combined with other movements that make it possible to move forward the points of contact between each back-and-forth movement so as to cover the zone of the radius of curvature.

According to another operating mode, the point support can move over the surface of the last layer that is placed by gliding and/or by rolling. In this case, the point support remains in contact with the last fiber layer that is placed.

Advantageously, the fiber layers are heated—using heating means 26—to a temperature on the order of 80° C. in such a way as to produce a viscosity of the resin of approximately 100 Pa·s. This viscosity makes it possible for the resin to be fluid enough in such a way as to fill in all of the spaces that are present between the layers and the fibers without being too fluid so as to limit the risks of wringing out the zone of the radius of curvature.

Advantageously, the fiber layers are covered by a bladder 28, and an air vacuum is produced under the bladder in such a way as to preserve the deformation that is produced by the localized forces and to prevent a possible spacing of the fiber layers after the localized forces disappear.

According to one embodiment, for producing the point support, it is possible to use a roller 30 that moves in a direction that is parallel to the longitudinal direction. Preferably, the axis of rotation 32 of the roller is placed in a transverse plane.

Advantageously, the roller 30 makes several passes, with each pass being characterized by a different angle of the roller, as illustrated in FIGS. 4A to 4C, in such a way as to make different passes parallel to the longitudinal direction, covering the zone of the radius of curvature and preferably in the zones that are close on either side of the radius of curvature.

According to a preferred operating mode, the phase for deposition of the fiber layers comprises the following phases:
  Deposition of 5 to 10 fiber layers on the device 22,
  Installation of a bladder 28 and extraction of air that is present under the bladder,
  Heating the fiber layers to a temperature on the order of 80° with the heating means 26,
  Application of localized forces with a point support in such a way as to obtain an optimal contraction in the zone of the radius of curvature,
  Cooling of the material,
  Removal of the bladder 28,
  Deposition of the following 5 to 10 layers and repetition of the preceding sequence.

Advantageously, the point support is maneuvered by a machine for deposition of fiber layers.

According to one embodiment, as illustrated in FIG. 5, it is possible to use a machine for deposition of fiber layers 34 comprising an arm 36 whose end 38 can be moved in three translational movements X, Y, Z corresponding to the axes of an orthonormed reference point. The device 22 is supported by a mandrel 40 with an axis of rotation 42 that is parallel to the longitudinal direction of the part that is to be produced and in the direction X.

The heating means 26 come in the form of infra-red-type lamps, for example, placed around the device 22.

The roller 30 can be supported by the arm of the deposition machine 34. In this case, the roller 30 is mounted to pivot along an axis of rotation 32 (contents in a YZ plane) on a support 46 that can itself pivot along an axis of rotation that is parallel to the X-axis relative to a tool holder 48 that is attached to the arm 36 of the deposition machine 34.

As a variant, the roller 30 can integrate heating means.

According to other embodiments, the roller can be replaced by a gliding pad or by a sonotrode.

The invention claimed is:

1. A method of producing a part made of composite material having at least one radius of curvature, the method comprising:
  depositing pre-impregnated fiber layers on one another on a device having a convex shape on and compacting the layers by applying localized and repeated forces by successively passing a point support perpendicular to the radius of curvature over portions of an entire zone of the radius of curvature at different angles to cover the entire zone of the radius of curvature, each of the portions being less than half of the zone of the radius of curvature, wherein, at a given instant, the forces are applied on the portion of the zone that are less than half the zone of curvature, so as to compact the fiber layer locally during the depositing and compacting, and prior to applying localized forces, covering the fiber layers with a bladder and extracting air under the bladder.

2. The method according to claim 1, further comprising heating the fiber layers using one or more heaters.

3. The method according to claim 1, wherein the point support moves over the surface of the last layer placed, by gliding and/or by rolling.

4. The method according to claim 3, further comprising using a roller as the point support.

5. The method according to claim 1, further comprising depositing several fiber layers, compacting the fiber layers already placed, and then depositing several fiber layers on the fiber layers already compacted.

6. The method according to claim 1, wherein the point support is a single point support configured to change angles to pass over the portions of the entire zone of the radius of curvature at different angles.

\* \* \* \* \*